WILLIAM R. KNOWLES.
Breeching-Stay for Harness.
No. 125,963.            Patented April 23, 1872.
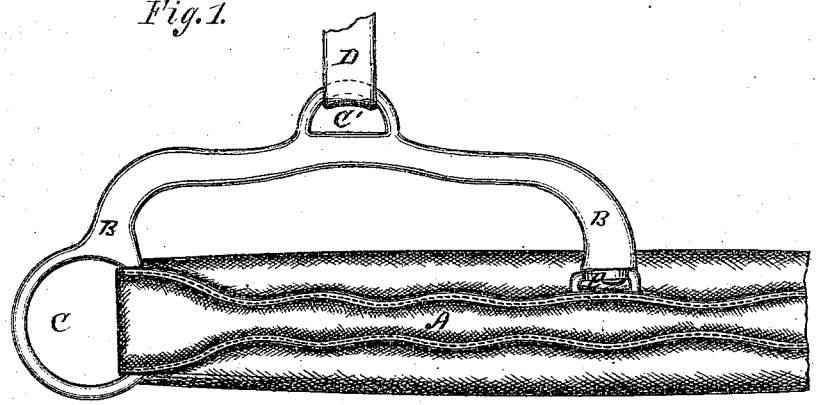
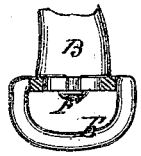
Witnesses:
G. Matthys
C. Otey Gwatkin
Inventor:
William R. Knowles,
by B. F. James,
his Atty.

125,963.

UNITED STATES PATENT OFFICE.

WILLIAM R. KNOWLES, OF COLUMBIANA, OHIO.

IMPROVEMENT IN BREECHING-STAYS FOR HARNESS.

Specification forming part of Letters Patent No. 125,963, dated April 23, 1872.

*To all whom it may concern:*

Be it known that I, WILLIAM R. KNOWLES, of the town of Columbiana and State of Ohio, have invented a new and useful improvement in Breeching-Stays for Harness; and I do hereby declare the following to be a clear, full, and exact description of the construction and operation of the same, reference being had to the accompanying drawing making part and parcel of this my specification.

The nature of my invention consists in the construction of a metallic breeching-stay for harness, and attaching the same to the leather constituting the breeching, and having formed upon such stay slots or rings that admit of its being connected with the back-strap of the saddle, and the forward strap that is attached to that portion of the saddle that supports the shafts of a vehicle or to a strap that is adjusted to any hold-back upon the shafts of a vehicle. The object of this invention is to avoid the unnecessary use of leather, as is ordinarily employed for a similar purpose in harness now in use, as also the great strain that wears out such leather; also to furnish a neater and less complicated mode of attaching such stays to the breeching-strap. This stay can be made of metal, malleable or otherwise, in a very cheap manner, and can be applied to any harness—is less liable to get out of order and repair.

In the drawing, Figure 1 represents a side view of my invention attached to the breeching-strap A. B B is the metallic stay having formed upon it the rings or slots C C'. To the larger ring or slot c is attached the forward portion of the leather breeching-strap A, and to the smaller ring or slot C' is attached the strap D, connecting it to and with the back-strap of the harness. The rear end of the stay is connected to the leather breech-strap A by means of an eye, E, having formed upon its upper side a slot, G. To this eye the stay B is secured by means of the screw or rivet F, the head of which retains it firmly, while allowing a free play within the slot, compensating for any strain or movement of the breeching-strap. The stay B being metallic, can be japanned or covered with leather, if desired; if the latter, I cause a groove to be formed on the inner side of the stay into which the seam of the leather may be pressed to prevent the rubbing against the side of the horse. The eye E being of loop-form, is sewed into the breeching-strap A, or it may be so constructed as to have it riveted thereupon, by being made of solid metal, while retaining upon its upper side a slot to which the stay may be attached.

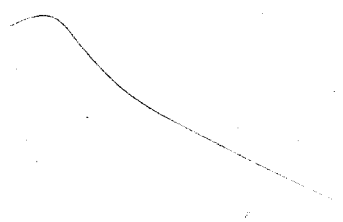

What I claim as my invention, and desire to secure by Letters Patent, is—

1. The combination of the stay B with the eye or loop E, and breeching-strap A, in the manner and for the purpose herein described.

2. The within described means and method of attachment of the stay B, to the loop or eye E, by the slot G, and screw or pivot F.

WILLIAM R. KNOWLES.

Witnesses:
   F. M. WOOD,
   BERTRAM RENKENBERGER.